(12) United States Patent
Fujii

(10) Patent No.: US 11,624,950 B2
(45) Date of Patent: Apr. 11, 2023

(54) LIGHT FLUX CONTROLLING MEMBER, LIGHT EMITTING DEVICE, SURFACE LIGHT SOURCE DEVICE, AND DISPLAY DEVICE

(71) Applicant: Enplas Corporation, Saitama (JP)

(72) Inventor: Yuki Fujii, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 17/722,495

(22) Filed: Apr. 18, 2022

(65) Prior Publication Data
US 2022/0334434 A1    Oct. 20, 2022

(30) Foreign Application Priority Data

Apr. 20, 2021 (JP) .............................. JP2021-070965
Aug. 20, 2021 (JP) .............................. JP2021-134689

(51) Int. Cl.
*G02F 1/00* (2006.01)
*G02F 1/1335* (2006.01)
*G02F 1/13357* (2006.01)

(52) U.S. Cl.
CPC ............ *G02F 1/133607* (2021.01); *G02F 1/133603* (2013.01); *G02F 1/133605* (2013.01)

(58) Field of Classification Search
CPC ......... G02F 1/133607; G02F 1/133603; G02F 1/133605
See application file for complete search history.

(56) References Cited

U.S. PATENT DOCUMENTS

| | | | | |
|---|---|---|---|---|
| 2014/0168999 | A1* | 6/2014 | Li | G02B 3/02 362/338 |
| 2015/0260371 | A1* | 9/2015 | Takatori | F21V 7/0066 362/307 |
| 2017/0031210 | A1* | 2/2017 | Kim | G02B 19/0071 |
| 2017/0328537 | A1* | 11/2017 | Fukuda | G02B 19/0028 |
| 2019/0361299 | A1* | 11/2019 | Nagami | G02F 1/133606 |
| 2021/0333639 | A1 | 10/2021 | Qiu | |

FOREIGN PATENT DOCUMENTS

CN    110208984 A    9/2019

* cited by examiner

*Primary Examiner* — Gerald J Sufleta, II
(74) *Attorney, Agent, or Firm* — Brundidge & Stanger, P.C.

(57) ABSTRACT

A light flux controlling member includes a plurality of incidence units disposed in a grid pattern and a plurality of emission units individually disposed between the plurality of incidence units. Each incidence unit includes an incidence surface disposed on a back side of the light flux controlling member, a first reflection surface disposed on a front side of the light flux controlling member at a position facing the light emitting element with the incidence surface placed between the first reflection surface and the light emitting element, and a second reflection surface disposed on the front side of the light flux controlling member at a position facing the side surface of the light flux controlling member with the first reflection surface placed between the second reflection surface and the side surface.

10 Claims, 14 Drawing Sheets

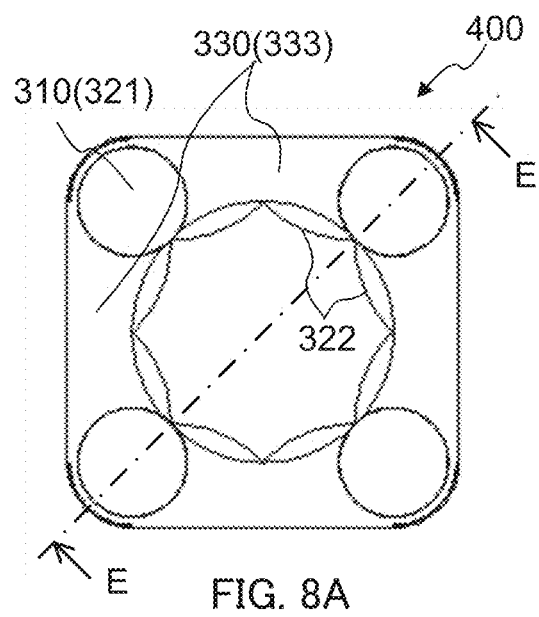
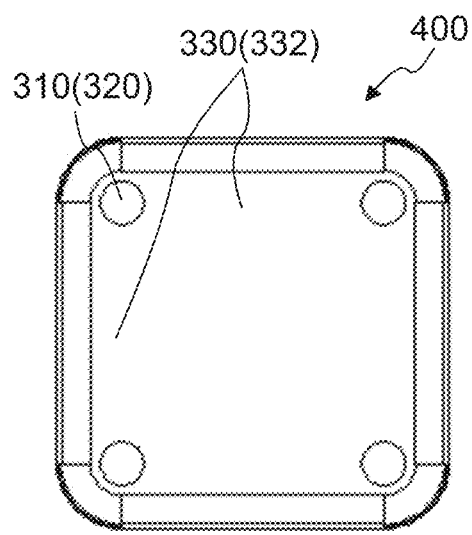
FIG. 8A   FIG. 8B
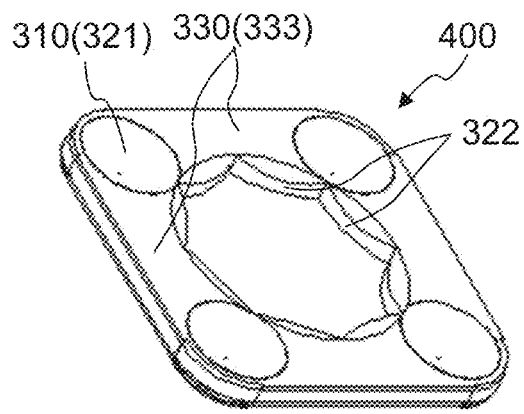
FIG. 8C   FIG. 8D
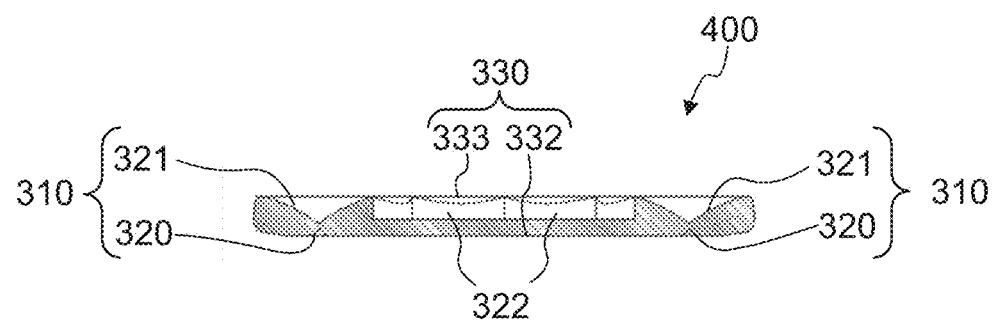
FIG. 8E

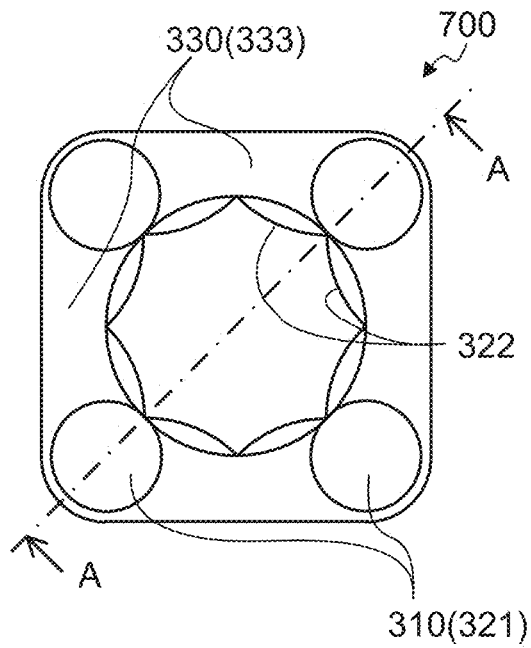
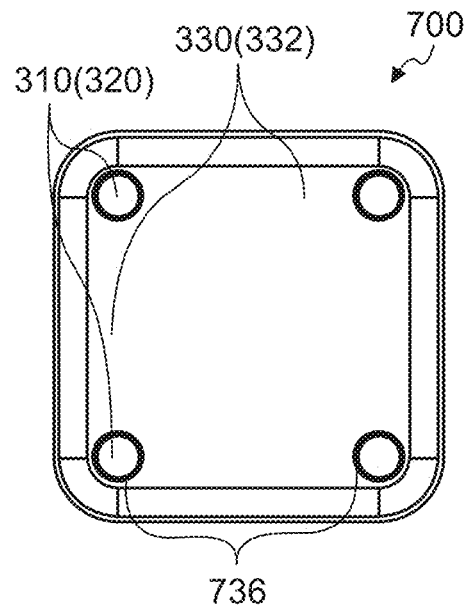
FIG. 11A  FIG. 11B
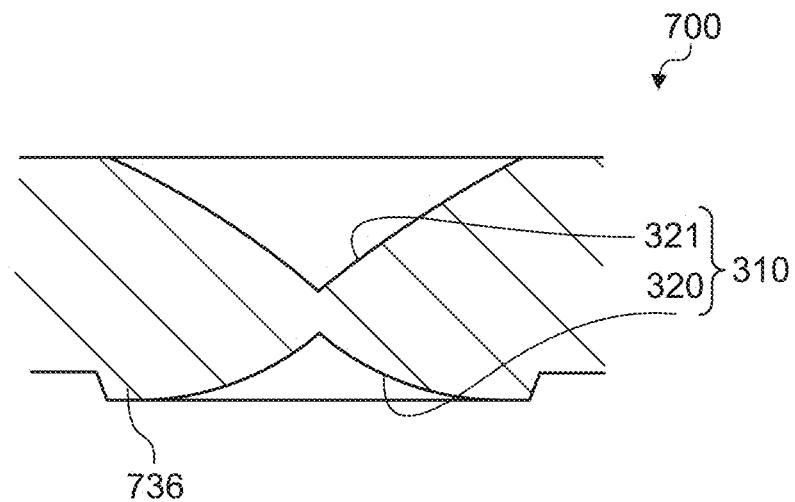
FIG. 11C

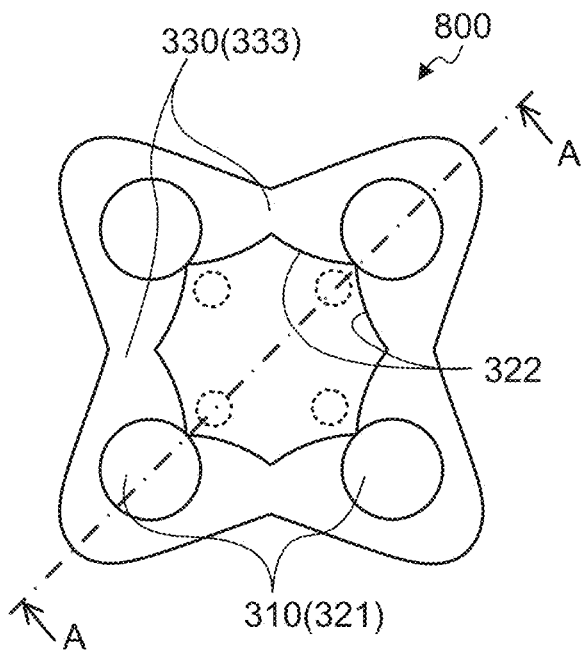
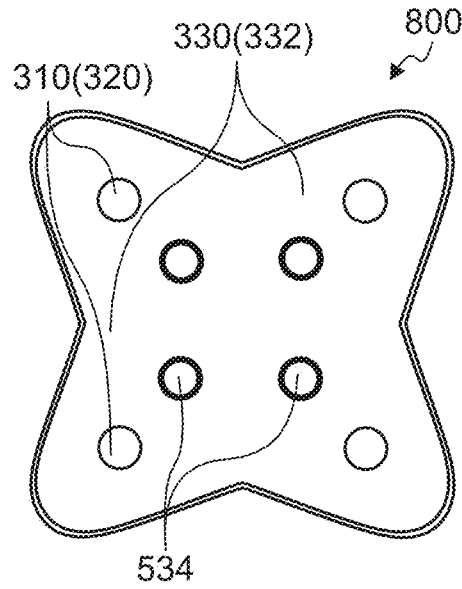
FIG. 12A  FIG. 12B
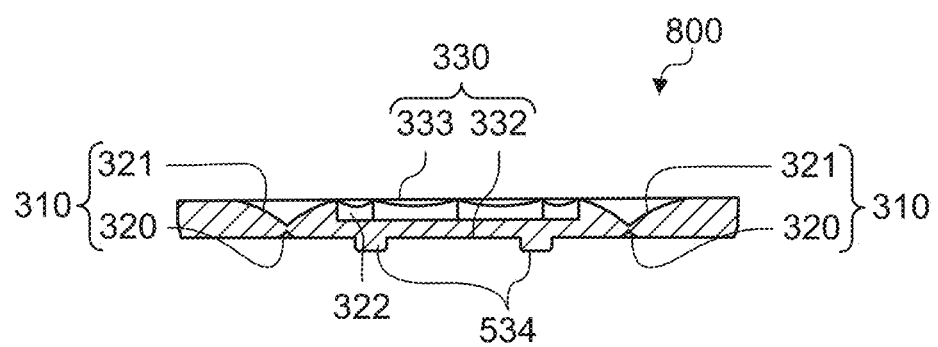
FIG. 12C

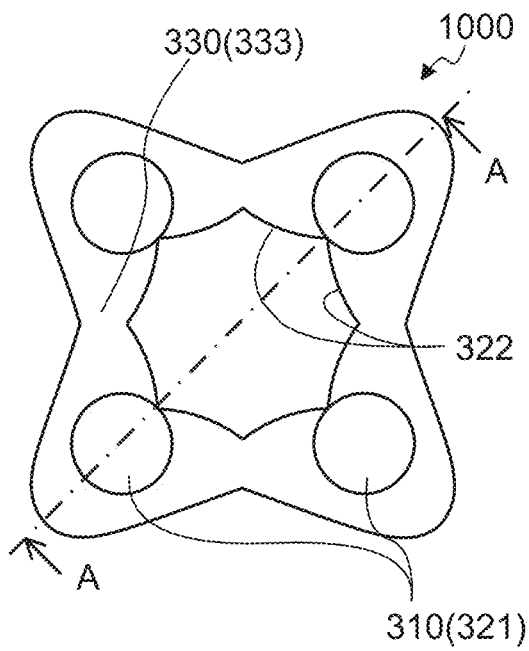
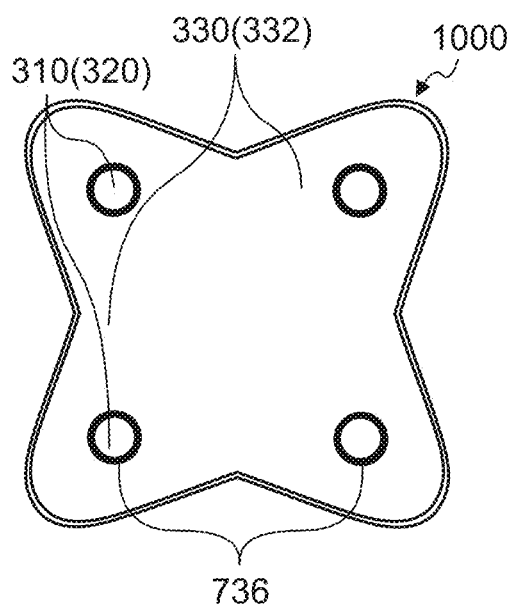
FIG. 14A    FIG. 14B
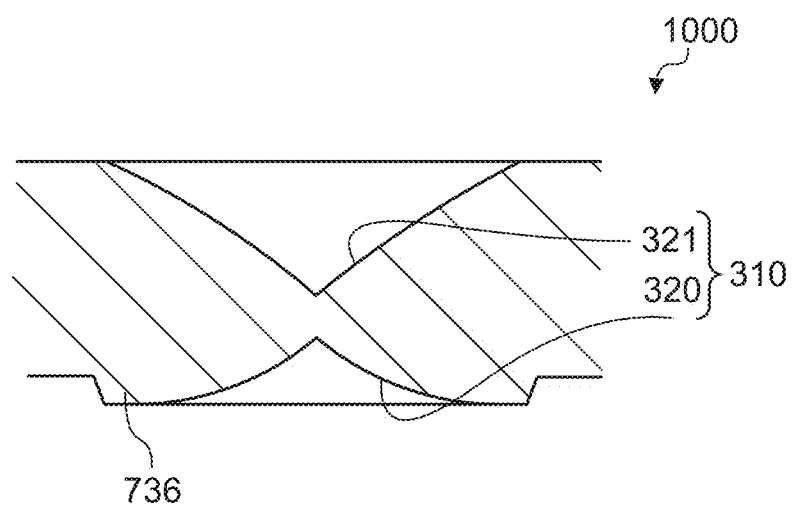
FIG. 14C

LIGHT FLUX CONTROLLING MEMBER, LIGHT EMITTING DEVICE, SURFACE LIGHT SOURCE DEVICE, AND DISPLAY DEVICE

CROSS REFERENCE TO RELATED APPLICATIONS

This application is entitled to the benefit of Japanese Patent Application No. 2021-070965, filed on Apr. 20, 2021 and Japanese Patent Application No. 2021-134689, filed on Aug. 20, 2021, the disclosures of which including the specifications, drawings and abstracts are incorporated herein by reference in its entirety.

TECHNICAL FIELD

The present invention relates to a light flux controlling member, a light emitting device, a surface light source device, and a display device.

BACKGROUND ART

In recent years, a direct surface light source device including a plurality of light emitting elements as a light source is used in transmission image display devices such as liquid crystal display devices. A large number of light emitting elements may be disposed to illuminate a wide range with light.

Patent Literature (hereinafter, referred to as PTL) 1 discloses a light flux controlling member (microarray lens) suitable for being disposed over a plurality of light emitting elements. A plurality of lenses are connected by a support plate in these microarray lenses, and one microarray lens is disposed above the plurality of light emitting elements (mini LEDs) disposed on a substrate. This configuration eliminates the necessity to dispose lenses individually above corresponding light emitting elements, and improves the handling property at the time of mounting to facilitate the mounting.

CITATION LIST

Patent Literature

PTL 1
Chinese Patent Application Publication No. 110208984

SUMMARY OF INVENTION

Technical Problem

In a surface light source device including thereon a large number of light emitting devices each including a plurality of light emitting elements and a light flux controlling member disposed above the light emitting elements as described above, the present inventors have made attempt to increase the distance between the light emitting devices to reduce the number of light emitting elements. In order to reduce the number of light emitting elements, it is considered necessary to expand light from each light emitting element to a wider range by a light flux controlling member. That is, it is considered necessary to prevent the light from concentrating locally.

From the above viewpoint, the present inventors have examined the expansion of light by disposing one light flux controlling member above four light emitting elements 220, and turning the four light emitting elements on, in a surface light source device as illustrated in FIG. 1A. The present inventors have found out as illustrated in FIG. 1B that on the light emitting surface (light diffusion plate) of the surface light source device, a larger amount of light is emitted from side portion 20 of the light flux controlling member than from corner portion 10 thereof, and a bright part is generated in the region corresponding to side portion 20. The reason therefor is considered as follows: the light from light emitting element 220 passes through the inside of the light flux controlling member and is emitted from side portion 20 located at a position far from this light emitting element 220 as shown by the arrows in light emitting element 220 on the upper right side in FIG. 1A as an example.

The existence of such a bright part means that the light is locally concentrated, which makes difficult to increase the distance between light flux controlling members because increasing the distance between the light flux controlling members causes luminance unevenness in the surface light source device.

An object of the present invention is to provide a light flux controlling member which is to be disposed above a plurality of light emitting elements in a surface light source device, and which can reduce the difference in the luminance on the light emitting surface in the surface light source device between a region corresponding to a corner portion of the light flux controlling member and a region corresponding to a side portion of the light flux controlling member. Another object of the present invention is to provide a light emitting device, a surface light source device, and a display device which include the light flux controlling member.

Solution to Problem

A light flux controlling member of the present invention is for controlling a distribution of light emitted from a plurality of light emitting elements disposed on a substrate, and includes: a plurality of incidence units for allowing thereon incidence of the light emitted from the plurality of light emitting elements respectively, the plurality of incidence units being disposed in a grid pattern; and a plurality of emission units individually disposed between the plurality of incidence units, the plurality of emission units allowing emission of the light incident on the plurality of incidence units while guiding the light, in which the plurality of incidence units each include: an incidence surface disposed on a back side of the light flux controlling member, the incidence surface allowing thereon incidence of the light emitted from the light emitting element, a first reflection surface disposed on a front side of the light flux controlling member at a position facing the light emitting element with the incidence surface placed between the first reflection surface and the light emitting element, the first reflection surface laterally reflecting the light incident on the incidence surface in such a way that the reflected light travels along the substrate to be away from an optical axis of the light emitting element, and a second reflection surface disposed on the front side of the light flux controlling member at a position facing a side surface of the light flux controlling member with the first reflection surface placed between the second reflection surface and the side surface, the second reflection surface laterally reflecting a part of the light reflected by the first reflection surface toward the side surface of the light flux controlling member.

A light emitting device of the present invention includes a plurality of light emitting elements disposed on a substrate, and the above-described light flux controlling member disposed above the plurality of light emitting elements.

A surface light source device of the present invention includes a plurality of the above-described light emitting devices and a light diffusion plate that transmits light emitted from the plurality of light emitting devices while diffusing the light.

A display device of the present invention includes the above-described surface light source device and a display member to be illuminated with light emitted from the surface light source device.

Advantageous Effects of Invention

The present invention is capable of providing a light flux controlling member that can reduce the difference in the luminance on the light emitting surface in the surface light source device between a region corresponding to a corner portion of the light flux controlling member and a region corresponding to a side portion of the light flux controlling member.

BRIEF DESCRIPTION OF DRAWINGS

FIGS. 1A and 1B are diagrams for explaining a luminance distribution when a plurality of light emitting elements disposed under a light flux controlling member is turned on;

FIGS. 8A to 8E illustrate a light flux controlling member according to modification 1 of embodiment 1;

FIGS. 11A to 11C illustrate a light flux controlling member according to modification 4 of embodiment 1;

FIGS. 12A to 12C illustrate a light flux controlling member according to embodiment 2;

FIGS. 14A to 14C illustrate a light flux controlling member according to modification 2 of embodiment 2.

DESCRIPTION OF EMBODIMENTS

Embodiment 1

Hereinafter, one or more embodiments of the present invention will be described in detail with reference to the drawings. In the following description, a surface light source device suitable for a backlight of a liquid crystal display device or the like will be described as a typical example of the surface light source device according to the present invention. This surface light source device can be used as display device 100' in combination with display member 102 (such as a liquid crystal panel) which is to be illuminated with light from the surface light source device (see FIG. 2B).

Configurations of Surface Light Source Device and Light Emitting Device

Figure 2A:
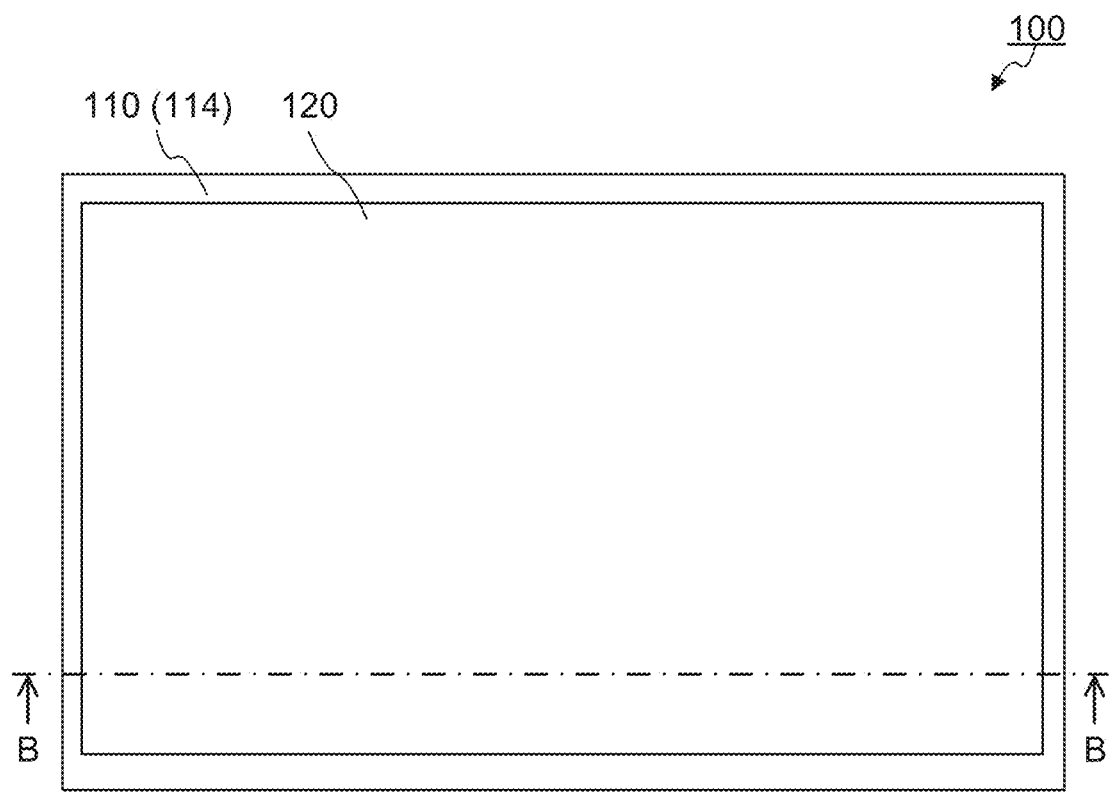
FIGS. 2A and 2B illustrate a surface light source device according to an embodiment.
Figure 2B:
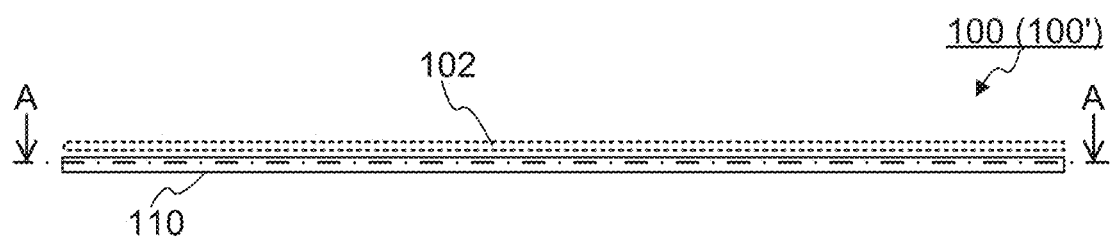
Figure 3A:
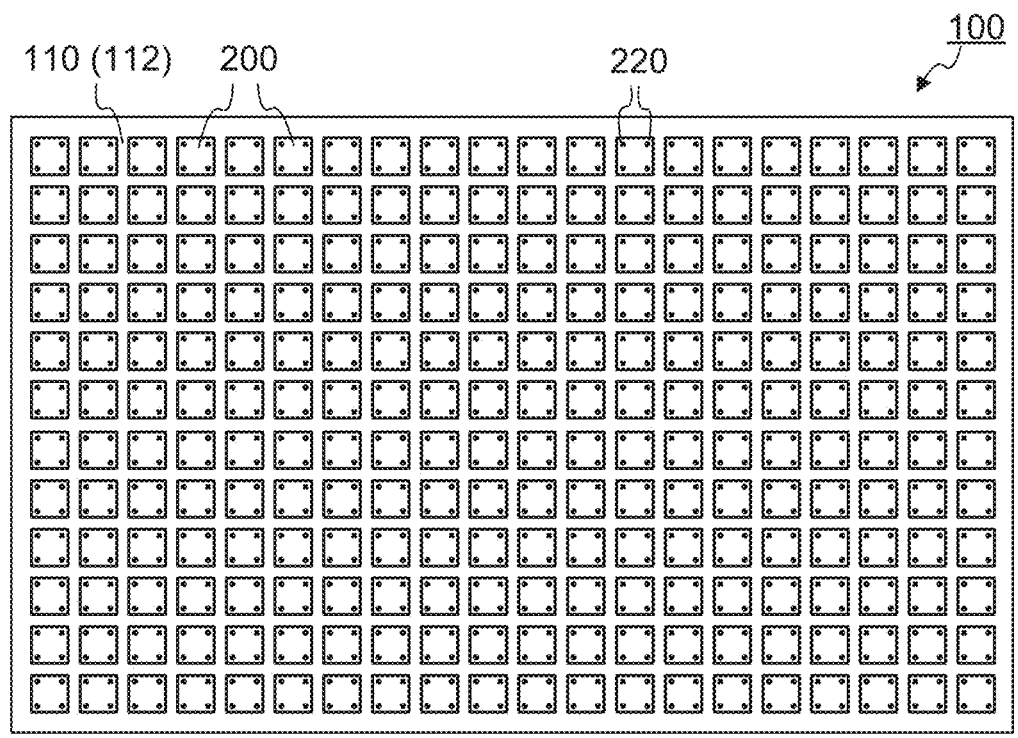
FIGS. 3A and 3B are cross-sectional views of the surface light source device according to the embodiment.
Figure 3B:
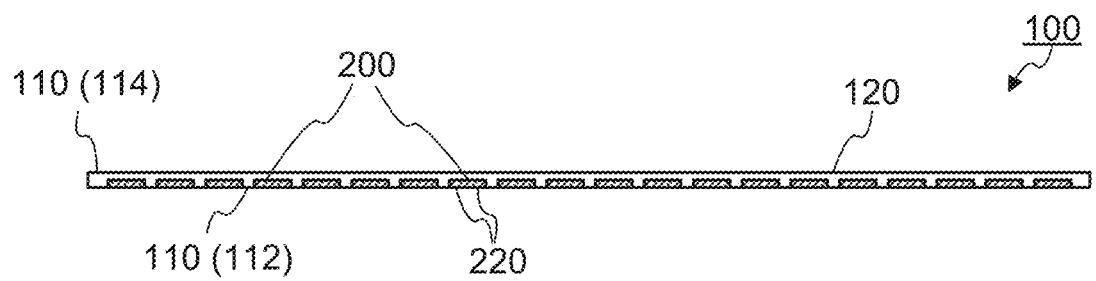
Figure 4:
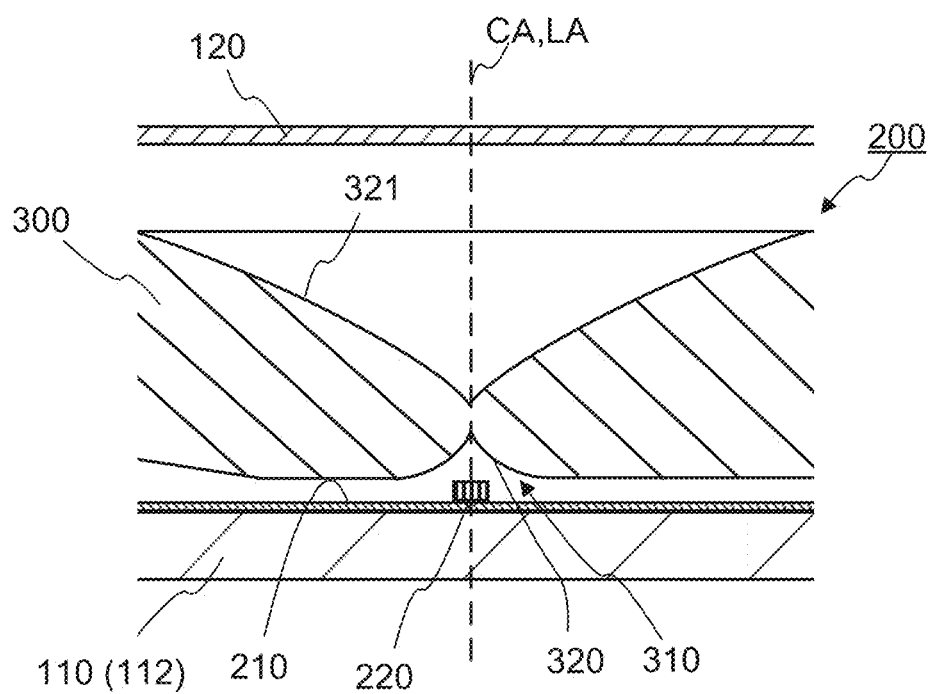
FIG. 4 is a partially enlarged cross-sectional view of FIG. 3B.

FIGS. 2A and 2B illustrate a configuration of surface light source device 100 according to an embodiment of the present invention. FIG. 2A is a plan view, and FIG. 2B is a front view. FIG. 3A is a cross-sectional view taken along line A-A of FIG. 2B, and FIG. 3B is a cross-sectional view taken along line B-B of FIG. 2A. FIG. 4 is a partially enlarged cross-sectional view illustrating an enlarged part of FIG. 3B.

As illustrated in FIGS. 2A to 3B, surface light source device 100 according to the present embodiment includes casing 110, plurality of light emitting devices 200, and light diffusion plate 120. The plurality of light emitting devices 200 are disposed in a grid pattern (in a matrix) on bottom plate 112 of casing 110. The inner surface of bottom plate 112 functions as a diffusive reflection surface. Top plate 114 of casing 110 is provided with an opening. Light diffusion plate 120 is disposed to close the opening, and functions as a light emitting surface. The light emitting surface may have any size which is, for example, about 400 mm×about 700 mm.

As illustrated in FIG. 4, light emitting device 200 is fixed on substrate 210. Substrate 210 is fixed at a predetermined position on bottom plate 112 of casing 110. Each light emitting device 200 includes plurality of light emitting elements 220 and light flux controlling member 300.

Light emitting element 220 is a light source of surface light source device 100 and is mounted on substrate 210. In the present embodiment, plurality of light emitting elements 220 are disposed in a grid pattern (in a matrix). In the present embodiment, the pitch between light emitting elements 220 individually disposed in corresponding light emitting devices 200 is longer than the pitch between light emitting elements 220 disposed in one light emitting device 200. Light emitting element 220 is, for example, a light emitting diode (LED). Light emitting element 220 may be of any type. For example, light emitting element 220 (for example, COB type light emitting diode) which emits light from the top surface and side surface(s) is suitably used in light emitting device 200 according to the present embodiment. The color of light emitted from light emitting element 220 may be any color, such as white, blue, and RGB. Light emitting element 220 may have any size, which is preferably 0.1 mm to 0.6 mm, more preferably 0.1 mm to 0.3 mm.

Light flux controlling member 300 is an optical member for controlling the distribution of light emitted from plurality of light emitting elements 220, and is fixed on substrate 210. In the present embodiment, light flux controlling member 300 is configured to control the distribution of light emitted from four light emitting elements 220. Light flux controlling member 300 includes plurality of incidence units 310. As described below, each incidence unit 310 (incidence surface 320) includes incidence surface 320 that allows thereon incidence of light emitted from light emitting element 220; first reflection surface 321 that reflects the light incident on incidence surface 320 toward emission unit 330; and second reflection surface 322 that reflects a part of the light reflected by first reflection surface 321 toward the side surface of light flux controlling member 300. In light flux controlling member 300 according to the present embodiment, incidence surface 320 and first reflection surface 321 are rotationally symmetric. The rotation axis of incidence surface 320 and first reflection surface 321 is referred to as the "central axis of incidence unit 310." In addition, "optical axis OA of light emitting element 220" means the central light beam of a stereoscopic emission light flux from light emitting element 220. A gap for releasing the heat generated by light emitting element 220 to the outside may or may not be formed between substrate 210 with light emitting element 220 mounted thereon and the back surface of light flux controlling member 300.

A reflective sheet is preferably provided between substrate 210 with light emitting element 220 mounted thereon and the back surface of light flux controlling member 300. A sheet having low gloss is preferably used as the reflective sheet. The generation of specular components (specular reflection components) is preferably reduced and the light is preferably diffusely reflected. This configuration increases the number of light beams that are reflected on the back surface of an optical sheet (member disposed above light emitting device 200) of surface light source device 100 and incident at a small angle to the position corresponding to the area between light emitting devices 200. For using a sheet that converts the light from light emitting device 200 into light with a desired color as the optical sheet of surface light source device 100, reducing the angle of light beams incident on the back surface of the conversion sheet can promote the incidence of light into the conversion sheet, thus improvement in conversion efficiency can be expected in the region corresponding to the area between light emitting devices 200. Examples of the reflective sheet having low gloss include sheets having a value of gloss of 25 to 50 GU or 1 to 20% when the value is measured with the incident angle of the gloss meter set to 60°.

Light flux controlling member 300 is formed by integral molding. The material of light flux controlling member 300 may be any material that allows light with a desired wavelength to pass therethrough. The material of light flux controlling member 300 is, for example, an optically transparent resin such as polymethylmethacrylate (PMMA), a polycarbonate (PC), or an epoxy resin (EP), or glass. The configuration of light flux controlling member 300 will be described below.

Light diffusion plate 120 is a plate-shaped member having a light diffusing property, and the plate transmits light emitted from light emitting device 200 while diffusing the light. Normally, the size of light diffusion plate 120 is substantially the same as that of the display member such as a liquid crystal panel. Light diffusion plate 120 is formed of, for example, an optically transparent resin such as polymethylmethacrylate (PMMA), a polycarbonate (PC), polystyrene (PS), or a styrene-methylmethacrylate copolymer resin (MS). In order to provide a light diffusing property, minute irregularities are formed in the surface of light diffusion plate 120, or light diffusing members such as beads are dispersed inside light diffusion plate 120.

In surface light source device 100 according to the present embodiment, light emitted from each light emitting element 220 is expanded by light flux controlling member 300 so as to illuminate a wide range of light diffusion plate 120. The light emitted from each light flux controlling member 300 is further diffused by light diffusion plate 120. Surface light source device 100 according to the present embodiment can thus uniformly illuminate a plate-shaped display member (for example, a liquid crystal panel).

Configuration of Light Flux Controlling Member

Figure 5A:
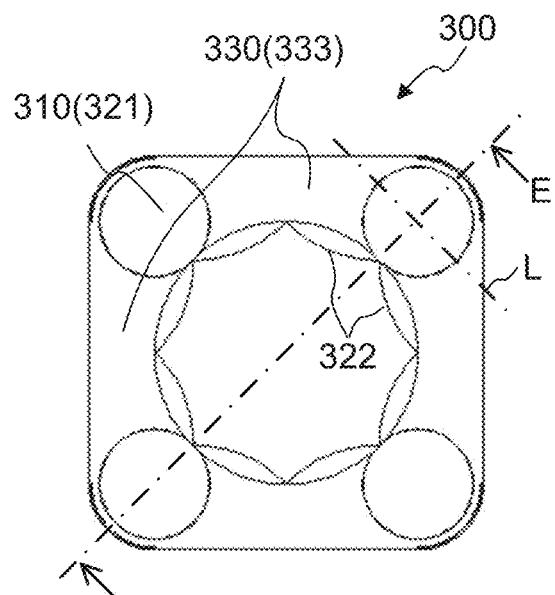
FIGS. 5A to 5E illustrate a light flux controlling member according to embodiment 1.
Figure 5B:
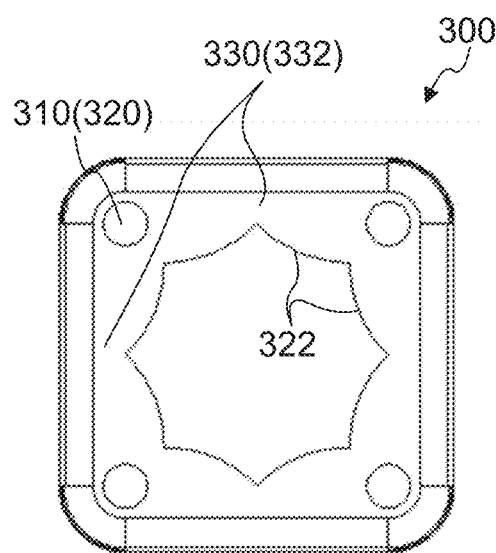
Figure 5C:
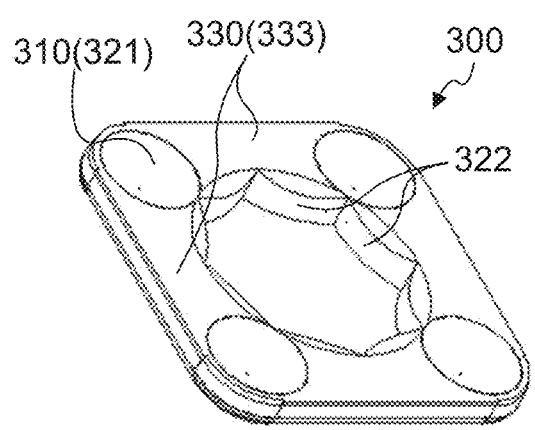
Figure 5D:
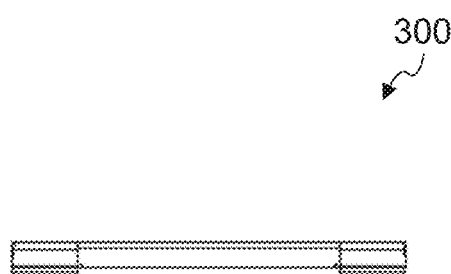
Figure 5E:
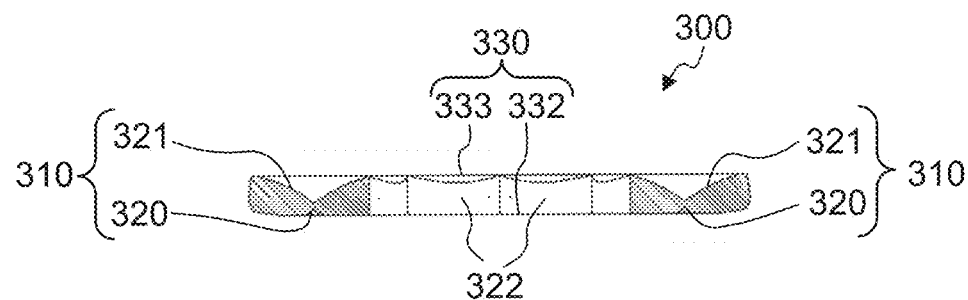

FIG. 5A is a plan view of light flux controlling member 300 in light emitting device 200 according to the present embodiment, FIG. 5B is a bottom view of light flux controlling member 300, FIG. 5C is a perspective view of light flux controlling member 300, FIG. 5D is a front view of light flux controlling member 300, and FIG. 5E is a cross-sectional view taken along line E-E of FIG. 5A. The following describes the configuration of light flux controlling member 300.

As illustrated in FIG. 5A, light flux controlling member 300 is a substantially rectangular plate-shaped member having rounded corners in a plan view in the present embodiment.

As illustrated in FIGS. 5A to 5E, light flux controlling member 300 according to the present embodiment is for controlling the distribution of light emitted from plurality of light emitting elements 220 disposed on substrate 210. Light flux controlling member 300 includes plurality of incidence units 310 and plurality of emission units 330. Plurality of incidence units 310 are disposed in a grid pattern corresponding to the arrangement of light emitting elements 220. Herein, a grid is a figure created by the intersection of parallel lines at equal intervals. It is preferable that the line connecting the centers of four incidence units 310 closest to each other among plurality of incidence units 310 forms a quadrangle, such as a square, a rectangle, or a parallelogram. In other words, the number of incidence units 310 is preferably four or more. The plurality of emission units 330 individually disposed between the incidence units 310 in a direction along substrate 210.

Each incidence unit 310 allows thereon incidence of light emitted from corresponding light emitting element 220. Incidence unit 310 includes incidence surface 320 that allows thereon incidence of light emitted from light emitting element 220; first reflection surface 321 that reflects the light incident on incidence surface 320 toward emission units 330; and second reflection surface 322 that laterally reflects the light reflected by first reflection surface 321 toward the side surface of light flux controlling member 300.

Incidence surface 320 is disposed on the back side of light flux controlling member 300 and is an inner surface of a recess formed at a position facing light emitting element 220. Incidence surface 320 allows the majority of light emitted from light emitting element 220 to enter light flux controlling member 300, while controlling the travelling direction of the light. Incidence surface 320 intersects optical axis OA of light emitting element 220 and is rotationally symmetric (circular symmetric) about central axis CA. Incidence surface 320 may have any shape which is set in such a way that the light incident on incidence surface 320 is directed to first reflection surface 321 and emission surface 333. In the present embodiment, incidence surface 320 has a shape such that the distance from the surface to substrate 210 gradually decreases as the distance from the surface to optical axis OA of light emitting element 220 increases (see FIG. 4).

First reflection surface 321 is disposed on the front side of light flux controlling member 300 at a position facing light emitting element 220 with incidence surface 320 placed between the first reflection surface and the light emitting element. The first reflection surface laterally reflects the light incident on incidence surface 320 in such a way that the reflected light travels away from optical axis OA of light emitting element 220. More specifically, first reflection surface 321 is preferably configured in such a way that substantially all the light emitted from the center of the light emitting surface of light emitting element 220 is reflected by first reflecting surface 321. Herein, "laterally" does not mean a direction toward the outer edge of light flux controlling member 300, but means any direction directed outward in the radial direction 360° about optical axis OA.

First reflection surface 321 thus can prevent light incident on incidence surface 320 from escaping upward, thereby preventing the generation of a bright part immediately above light emitting element 220, and can also guide the light between light emitting elements 220, thereby preventing the generation of a dark part between light emitting elements 220. First reflection surface 321 may have any shape as long as the light incident on incidence surface 320 is laterally reflected. First reflection surface 321 is configured, for example, to be rotationally symmetric (circularly symmetric) about central axis CA of light emitting element 220, and to approach the front side (away from substrate 210) as the distance from the surface to optical axis OA of light emitting element 220 increases.

The generatrix from the central portion to the outer peripheral portion of this rotationally symmetric surface is a curved line or a straight line inclined with respect to central axis CA. First reflection surface 321 is a concave surface in a state obtained by rotating the generatrix by 360° with central axis CA of incidence surface 320 as a rotation axis.

In the present embodiment, incidence surface 320 and first reflection surface 321 are each an inner surface of a recess. The area of the opening edge of the recess forming first reflection surface 321 is preferably 0.5 to 3.0 times, more preferably 1.0 to 2.5 times, the area of the opening edge of the recess forming incidence surface 320, in plan view.

Second reflection surface 322 is disposed on the front side of light flux controlling member 300 at a position facing the side surface of light flux controlling member 300 with first reflection surface 321 placed between the second reflection surface and the side surface. The second reflection surface laterally reflects a part of the light reflected by first reflection surface 321 toward the side surface of light flux controlling member 300.

In the present embodiment, second reflection surface 322 is an inner surface of a through hole that opens onto the front side and the back side of light flux controlling member 300. When light flux controlling member 300 is viewed in plan view, this through hole is disposed at the central part of light flux controlling member 300. From the viewpoint of efficiently reflecting the light that has reached second reflection surface 322 from first reflection surface 321, second reflection surface 322 is disposed as follows. When light flux controlling member 300 is viewed in plan view as illustrated in FIG. 5A, in one incidence unit 310 (for example, incidence unit 310 on the upper right side in FIG. 5A), second reflection surface 322 is disposed in such a way that the distance from the surface to a second straight line (for example, straight line L in FIG. 5A) increases as the distance from the surface to a first straight line (for example, line E-E in FIG. 5A) increases. In this configuration, the first straight line connects optical axis OA of light emitting element 220 corresponding to this incidence unit 310 with the center of gravity of a triangle, which is formed by connecting centers to each other—the centers are respectively of this incidence unit 310 and two incidence units 310 closest to this incidence unit 310 among the plurality of incidence units 310; and the second straight line passes through the optical axis of light emitting element 220 and is perpendicular to the first straight line. Therefore, in the horizontal cross section (cross section parallel to substrate 210) of light flux controlling member 300, second reflection surface 322 is a curved line or a straight line inclined with respect to the first straight line (for example, line E-E of FIG. 5A). In the present embodiment, the first straight line coincides with the diagonal line of the grid of incidence units 310 disposed in a grid pattern.

Second reflection surface 322 may have any inclination angle with respect to substrate 210 (inclination angle in the vertical cross section of light flux controlling member 300), and the inclination angle is preferably in the range of 70° to 110° from the viewpoint of laterally reflecting light toward the side surface of light flux controlling member 300. In the present embodiment, the inclination angle of second reflection surface 322 with respect to substrate 210 is approximately 90°.

Second reflection surface 322 having the above configuration allows a part of the light reflected by first reflection surface 321 to be laterally reflected by second reflection surface 322 toward the side surface of light flux controlling member 300, and emitted from the side surface of light flux controlling member 300. In the present embodiment, the majority of the light reflected by second reflection surface 322 is emitted to the outside from the side surface of emission unit 330 in light flux controlling member 300 (see FIG. 6A).

Plurality of emission units 330 emit light incident on plurality of incidence units 310 while guiding the light. In the present embodiment, on the assumption that four incidence units 310 are disposed at individual corners of a virtual quadrangle, light flux controlling member 300 includes four emission units 330 individually disposed at positions corresponding to the four sides of the virtual quadrangle in such a way that each emission unit is disposed along the corresponding side. Each emission unit 330 includes third reflection surface 332 which is disposed on the back side of light flux controlling member 300, and which reflects light from first reflection surface 321 of incidence unit 310. Emission unit 330 also includes emission surface 333 which is disposed on the front side of light flux controlling member 300 so as to face third reflection surface 332, and which reflects a part of the light from incidence unit 310 and emits another part of the light. In addition, a part of the light guided in emission unit 330 is also emitted to the outside from the side surface of light flux controlling member 300.

Emission surface 333 may have any shape. In the present embodiment, four emission surfaces 333 disposed at the positions corresponding to the four sides of the virtual quadrangle are flat surfaces.

Optical Path in Light Emitting Device

Figure 6A:
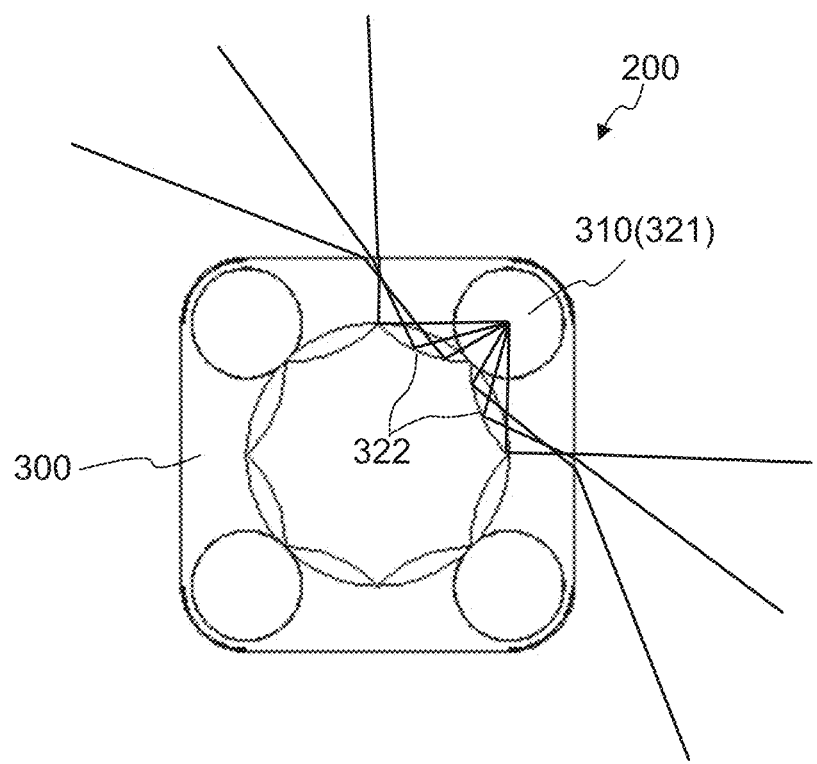
FIGS. 6A and 6B illustrate optical paths in a light emitting device according to embodiment 1.
Figure 6B:
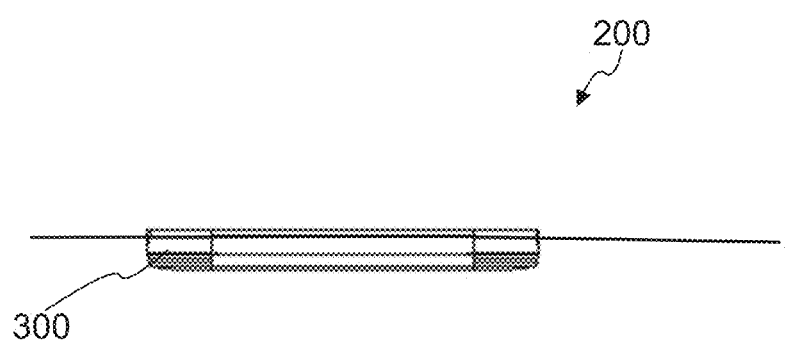

FIGS. 6A and 6B illustrate optical paths in light emitting device 200. FIG. 6A illustrates optical paths when light emitting device 200 is viewed through in plan view, and FIG. 6B illustrates optical paths when light emitting device 200 is viewed through in side view.

As illustrated in FIG. 6A, in light emitting device 200 according to the present embodiment, a part of the light emitted from light emitting element 220 is laterally reflected by first reflection surface 321 and directed toward second reflection surface 322. As illustrated in FIGS. 6A and 6B, the light having reached second reflection surface 322 is laterally reflected toward the side surface of light flux controlling member 300, and emitted to the outside from the side surface of light flux controlling member 300. The light sequentially reflected by first reflection surface 321 and second reflection surface 322 is emitted from the side surface of light flux controlling member 300 to the outside of the light flux controlling member 300. The light emitted to the outside of light flux controlling member 300 includes light substantially parallel to the substrate.

Illuminance Distribution

In order to confirm the effect of light flux controlling member 300 according to the present embodiment, simulation of illuminance distribution is performed for surface light source device 100 including light emitting device 200 according to the present embodiment and a surface light source device including a light emitting device according to a comparative example.

Figure 1A:
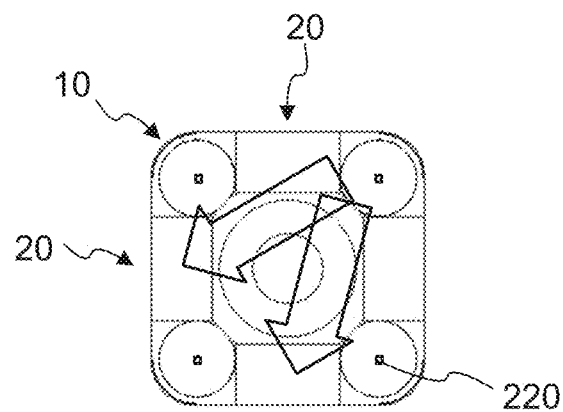
Figure 1B:
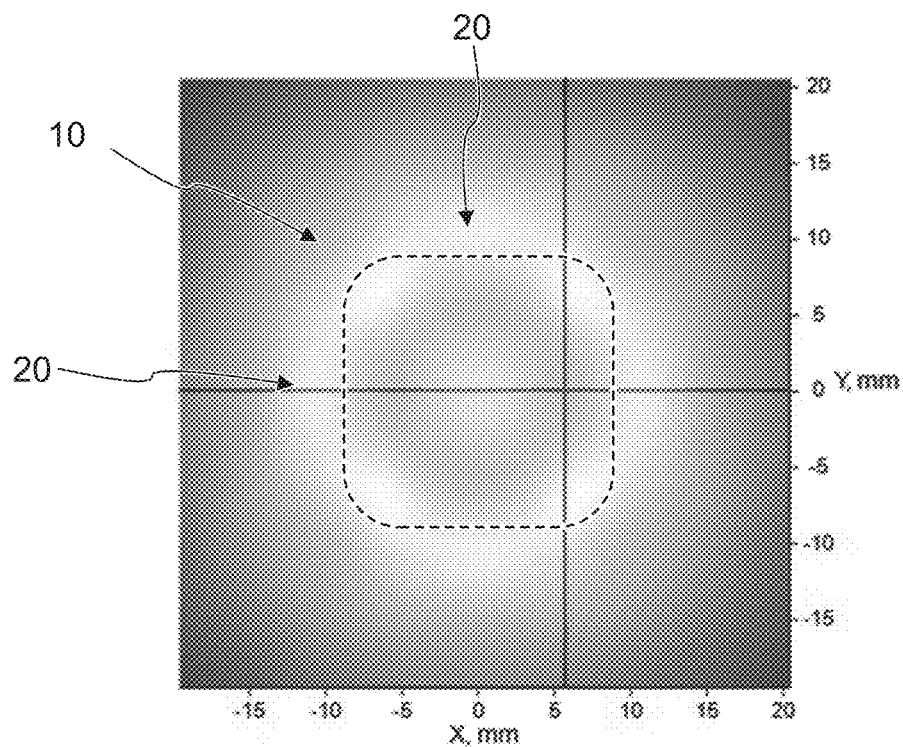
Figure 7A:
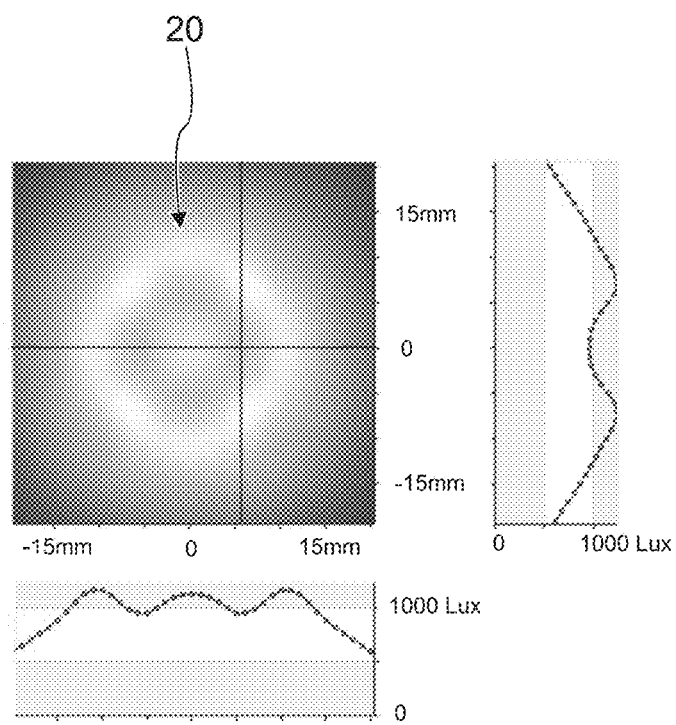
FIG. 7A illustrates the illuminance distribution in a surface light source device according to a comparative example.
Figure 7B:
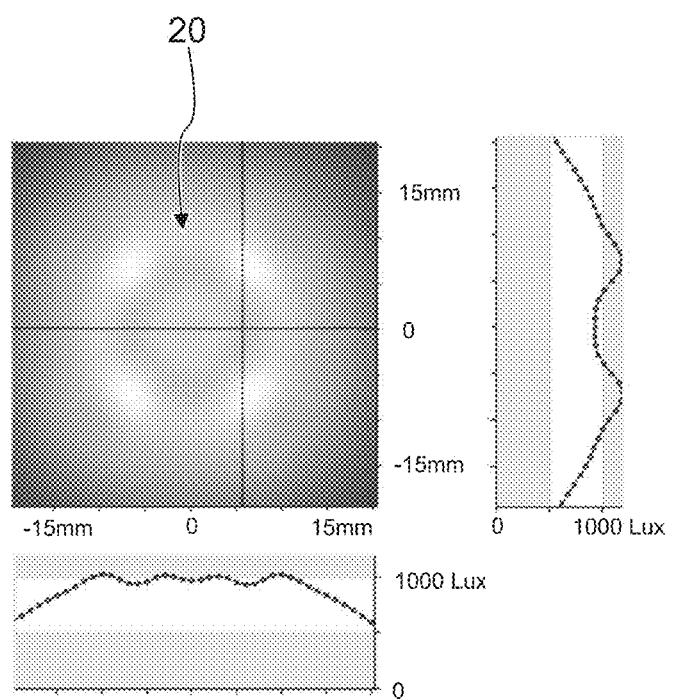
FIG. 7B illustrates the illuminance distribution in the surface light source device according to embodiment 1.

The simulation results are shown in FIGS. 7A and 7B. FIG. 7A illustrates the illuminance distribution in the surface light source device according to the comparative example. A light flux controlling member including no second reflection surface 322 as illustrated in FIG. 1A is used in the surface light source device of FIG. 7A. FIG. 7B illustrates the illuminance distribution in surface light source device 100 according to the embodiment. Light flux controlling member 300 including second reflection surface 322 as illustrated in FIGS. 5A to 5E is used in surface light source device 100 of FIG. 7B. These simulation results show the illuminance distribution on the back surface of light diffusion plate 120 (the surface on the light emitting device 200 side).

In the present simulation, the illuminance distribution when only four light emitting elements 220 disposed under one light emitting device in each surface light source device are turned on is simulated. In FIGS. 7A and 7B, the lower graphs each show the illuminance distribution in the horizontal direction between two upper light emitting elements and two lower light emitting elements 220, and the right graphs each show the illuminance distribution in the vertical direction passing through the optical axes of two light emitting elements disposed on the right side.

The comparison between FIGS. 7A and 7B indicates the following. The region corresponding to side portion 20 of the light emitting device is excessively bright in the surface light source device according to the comparative example illustrated in FIG. 7A. On the other hand, the region corresponding to side portion 20 of light emitting device 200 illustrated in FIG. 7B has an appropriate brightness. This is because light flux controlling member 300 of FIG. 7B includes second reflection surface 322, and a part of light reflected by first reflection surface 321 does not travel into light flux controlling member 300 but is reflected by the second reflection surface. In other words, locally brightening is prevented and the light is expanded over a wide range in surface light source device 100 including light flux controlling member 300 according to the present embodiment.

Effects

Light flux controlling member 300 of the present embodiment can reduce the difference in the luminance on the light emitting surface of surface light source device 100 between a region corresponding to corner portion 10 of the light flux controlling member and a region corresponding to side portion 20 of the light flux controlling member. Therefore, the distance between light emitting devices 200 can be increased while luminance unevenness is reduced.

Modification 1 of Embodiment 1

Configurations of Surface Light Source Device, Light Emitting Device, and Light Flux Controlling Member The surface light source device according to modification 1 of embodiment 1 is different from surface light source device 100 according to embodiment 1 in that second reflection surface 322 is not the inner surface of a through hole but the inner side surface of a bottomed recess in light flux controlling member 400. In the surface light source device according to modification 1 of embodiment 1, the same members as in surface light source device 100 according to embodiment 1 are designated by the same reference numerals and the description thereof will be omitted.

FIGS. 8A to 8E illustrate light flux controlling member 400 according to modification 1 of embodiment 1. FIG. 8A is a plan view of light flux controlling member 400, FIG. 8B is a bottom view of light flux controlling member 400, FIG. 8C is a perspective view of light flux controlling member 400, FIG. 8D is a front view of light flux controlling member 400, and FIG. 8E is a cross-sectional view taken along line E-E of FIG. 8A.

In light flux controlling member 400 according to modification 1 of embodiment 1, second reflection surface 322 is an inner surface (inner side surface) of a bottomed recess that opens onto the front side of light flux controlling member 400. The portion under this recess (the portion between the bottom surface of the recess and the back surface of light flux controlling member 400) emits light from incidence unit 310 while guiding the light to function like emission unit 330. In light flux controlling member 400 according to the present modification, second reflection surface 322 has the same function as second reflection surface 322 of light flux controlling member 300 according to embodiment 1. That is, light reflected by first reflection surface 321 to reach second reflection surface 322 is laterally reflected by second reflection surface 322 toward the side surface of light flux controlling member 400, and emitted to the outside of light flux controlling member 400 from the side surface of light flux controlling member 400.

Effects

Light flux controlling member 400 according to modification 1 of embodiment 1 can also reduce the difference in the luminance on the light emitting surface of the surface light source device between a region corresponding to corner portion 10 of the light flux controlling member and a region corresponding to side portion 20 of the light flux controlling member in a similar manner to light flux controlling member 300 according to embodiment 1. Therefore, the distance between light emitting devices 200 can be increased while luminance unevenness is reduced.

Modification 2 of Embodiment 1

Configurations of Surface Light Source Device, Light Emitting Device, and Light Flux Controlling Member The surface light source device according to modification 2 of embodiment 1 is different from surface light source device 100 according to embodiment 1 in that second reflection surface 322 is the inner side surface of a bottomed recess, not of a through hole, in light flux controlling member 500, and the surface light source device according to modification 2 includes at least one leg 534 disposed on the back side of light flux controlling member 500. In the surface light source device according to modification 2 of embodiment 1, the same members as in surface light source device 100 according to embodiment 1 are designated by the same reference numerals and the description thereof will be omitted.

Figure 9A:
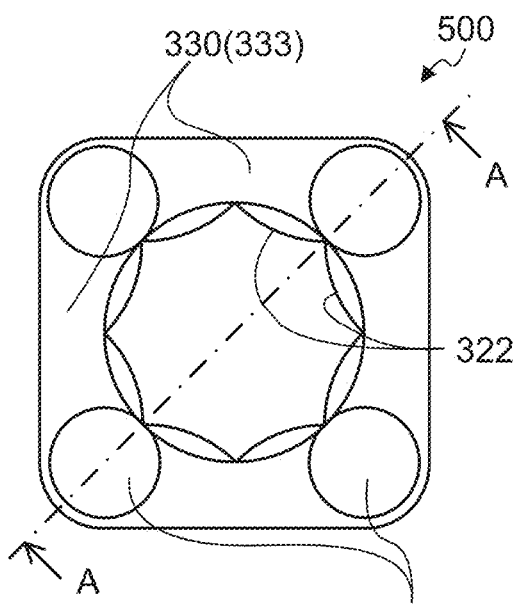
FIGS. 9A to 9C illustrate a light flux controlling member according to modification 2 of embodiment 1.
Figure 9B:
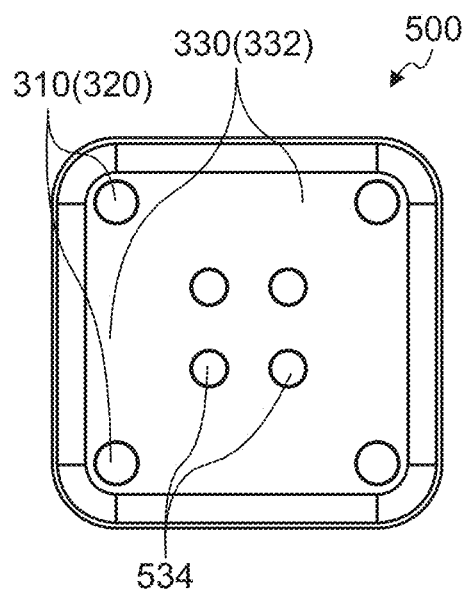
Figure 9C:
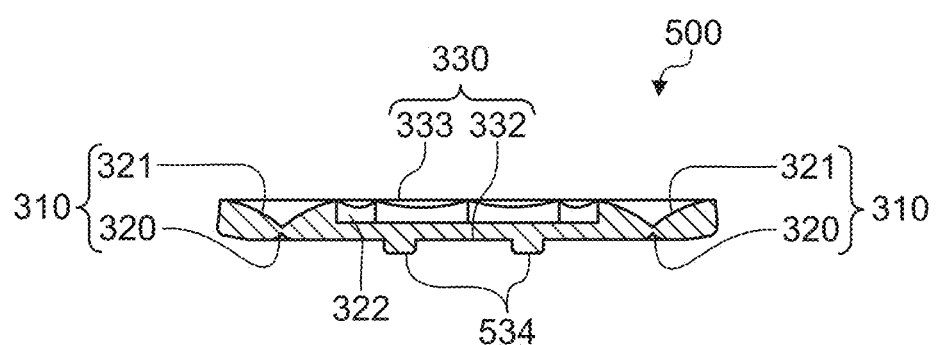

FIGS. 9A to 9C illustrate light flux controlling member 500 according to modification 2 of embodiment 1. FIG. 9A is a plan view of light flux controlling member 500, FIG. 9B is a bottom view of light flux controlling member 500, and FIG. 9C is a cross-sectional view taken along line A-A of FIG. 9A.

In light flux controlling member 500 according to the present modification, second reflection surface 322 is an inner surface of a bottomed recess that opens onto the front side of light flux controlling member 500. The portion under this recess (the portion between the bottom surface of the recess and the back surface of light flux controlling member 500) emits light from incidence unit 310 while guiding the light to function like emission unit 330. In light flux controlling member 500 according to the present modification, second reflection surface 322 has the same function as second reflection surface 322 of light flux controlling member 300 according to embodiment 1. That is, light reflected by first reflection surface 321 to reach second reflection surface 322 is laterally reflected by second reflection surface 322 toward the side surface of light flux controlling member 500, and emitted to the outside of light flux controlling member 500 from the side surface of light flux controlling member 500.

Light flux controlling member 500 according to the present modification further includes legs 534 in addition to plurality of incidence units 310 and plurality of emission units 330. Legs 534 are disposed on the back side of light flux controlling member 500, and used for fixing light flux controlling member 500 to substrate 210. Leg 534 may have any shape as long as the leg can exhibit the above function. In the present modification, leg 534 has a columnar shape. The number of legs 534 is also not limited, and may be one or more than one. In the present modification, the number of legs 534 is four. Leg 534 may be disposed at any position. For example, four legs 534 may be disposed so as to be respectively located at the corners of a rhombus or of a square. In the present modification, four legs 534 are disposed so as to be respectively located at the corners of a square. This configuration allows light flux controlling member 500 to be fixed to substrate 210 no matter what orientation the light flux controlling member has. Four legs 534 are disposed in such a way that when light flux controlling member 500 is viewed in plan view (viewed through in plan view), legs are closer to the center of gravity of light flux controlling member 500 than second reflection surfaces 322 are.

Effects

Light flux controlling member 500 according to the present modification can also reduce the difference in the luminance on the light emitting surface of the surface light source device between a region corresponding to corner portion 10 of light flux controlling member 500 and a region corresponding to side portion 20 of light flux controlling member 500 in a similar manner to light flux controlling member 300 according to embodiment 1. Therefore, the distance between the light emitting devices can be increased while luminance unevenness is reduced. In addition, when legs are disposed in the vicinity of the center (center of gravity) of a conventional light flux controlling member, a bright part is more likely to be generated immediately above the center of the light flux controlling member due to the influence of the legs. On the other hand, the amount of light that reaches the vicinity of the center of gravity of light flux controlling member 500 is reduced because of second reflection surface 322 in light flux controlling member 500 according to the present modification, thus even when legs are disposed in the vicinity the center of gravity of light flux controlling member 500, a bright part is less likely to be generated immediately above light flux controlling member 500.

Modification 3 of Embodiment 1

Configurations of Surface Light Source Device, Light Emitting Device, and Light Flux Controlling Member The surface light source device according to modification 3 of embodiment 1 is different from surface light source device 100 according to embodiment 1 in that second reflection surface 322 is the inner side surface of a bottomed recess, not of a through hole, in light flux controlling member 600, and the surface light source device according to modification 3 includes protrusion 635 disposed on the front side of light flux controlling member 600. In the surface light source device according to the present modification, the same members as in surface light source device 100 according to embodiment 1 are designated by the same reference numerals and the description thereof will be omitted.

Figure 10A:
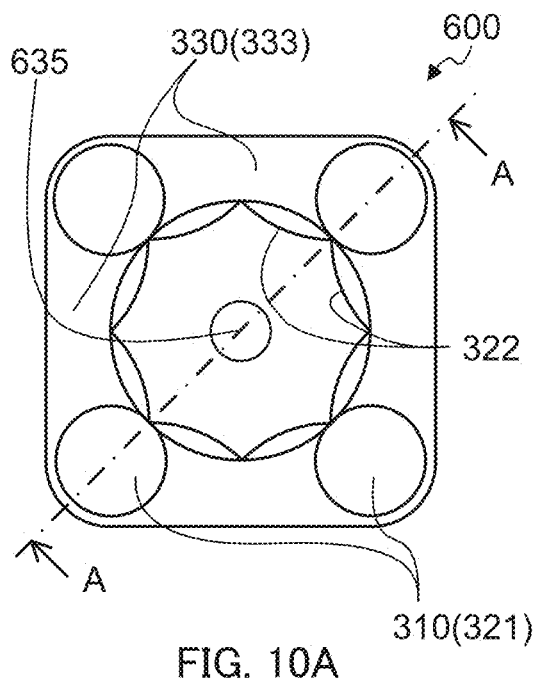
FIGS. 10A to 10C illustrate a light flux controlling member according to modification 3 of embodiment 1.
Figure 10B:
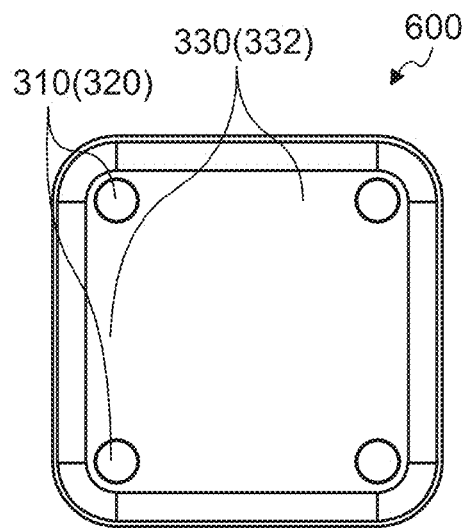
Figure 10C:
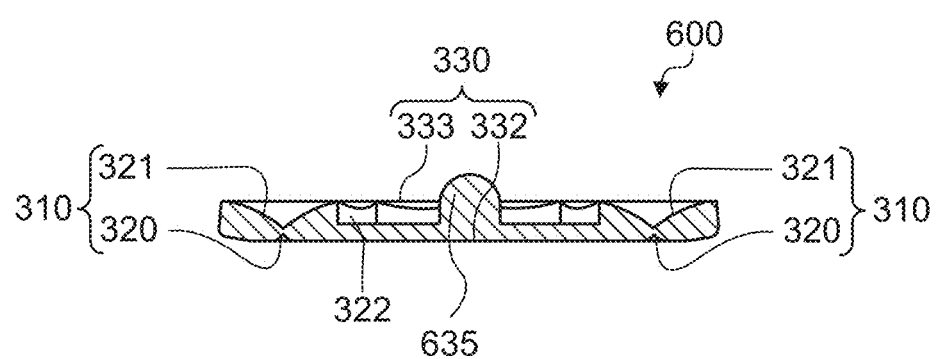

FIGS. 10A to 10C illustrate light flux controlling member 600 according to modification 3 of embodiment 1. FIG. 10A is a plan view of light flux controlling member 600, FIG. 10B is a bottom view of light flux controlling member 600, and FIG. 10C is a cross-sectional view taken along line A-A of FIG. 10A.

In light flux controlling member 600 according to the present modification, second reflection surface 322 is an inner surface of a bottomed recess that opens onto the front side of light flux controlling member 600. The portion under this recess (the portion between the bottom surface of the recess and the back surface of light flux controlling member 600) emits light from incidence unit 310 while guiding the light to function like emission unit 330. In light flux controlling member 600 according to the present modification, second reflection surface 322 has the same function as second reflection surface 322 of light flux controlling member 300 according to embodiment 1. That is, light reflected by first reflection surface 321 to reach second reflection surface 322 is laterally reflected by second reflection surface 322 toward the side surface of light flux controlling member 600, and emitted to the outside of light flux controlling member 600 from the side surface of light flux controlling member 600.

Light flux controlling member 600 according to the present modification further includes protrusion 635 in addition to plurality of incidence units 310 and plurality of emission units 330.

Protrusion 635 prevents light diffusion plate 120 from coming into contact with the surface of light flux controlling member 600 except for protrusion 635 when light diffusion plate 120 bends. Protrusion 635 projects from the surface of light flux controlling member 600 toward the front side (light diffusion plate 120 side), and the maximum height of protrusion 635 is higher than the maximum height of any portion of light flux controlling member 600 other than protrusion 635. Protrusion 635 may have any shape as long as the protrusion can exhibit the above function. Examples of the shape of the 635 include shapes of cones, truncated cones, columns, hemispheres, and combinations thereof. In the present modification, protrusion 635 has a shape in which a hemisphere is placed on a column. The number of protrusions 635 is not limited. The number of protrusions 635 may be one or more than one. In the present modification, the number of protrusions 635 is one. In the present modification, protrusion 635 is disposed at the central part of the recess that includes second reflection surface 322 as the inner side surface thereof (that is, the central part of light flux controlling member 600). When the number of protrusions 635 is four, protrusions 635 may be disposed at equal intervals in the central portion of the recess that includes second reflection surface 322 as the inner side surface thereof.

Effects

Light flux controlling member 600 according to the present modification can also reduce the difference in the luminance on the light emitting surface of the surface light source device between a region corresponding to corner portion 10 of light flux controlling member 600 and a region corresponding to side portion 20 of light flux controlling member 600 in a similar manner to light flux controlling member 300 according to embodiment 1. Therefore, the distance between the light emitting devices can be increased while luminance unevenness is reduced. In addition, as protrusion 635 is disposed, light diffusion plate 120 can be prevented from coming into contact with the surface of light flux controlling member 600 except for protrusion 635.

Modification 4 of Embodiment 1

Configurations of Surface Light Source Device, Light Emitting Device, and Light Flux Controlling Member The surface light source device according to modification 4 of embodiment 1 is different from surface light source device 100 according to embodiment 1 in that second reflection surface 322 is the inner surface of a bottomed recess, not of a through hole, in light flux controlling member 700, and the surface light source device according to modification 4 includes at least one convex part 736 disposed on the back side of light flux controlling member 700. In the surface light source device according to modification 3 of embodiment 1, the same members as in surface light source device 100 according to embodiment 1 are designated by the same reference numerals and the description thereof will be omitted.

FIGS. 11A to 11C illustrate light flux controlling member 700 according to modification 4 of embodiment 1. FIG. 11A is a plan view of light flux controlling member 700, FIG. 11B is a bottom view of light flux controlling member 700, and FIG. 11C is a cross-sectional view taken along line A-A of FIG. 11A (enlarged view of a portion of an incidence unit).

In light flux controlling member 700 according to the present modification, second reflection surface 322 is an inner surface of a bottomed recess that opens onto the front side of light flux controlling member 700. The portion under this recess (the portion between the bottom surface of the recess and the back surface of light flux controlling member 700) emits light from incidence unit 310 while guiding the light to function like emission unit 330. In light flux controlling member 700 according to the present modification, second reflection surface 322 has the same function as second reflection surface 322 of light flux controlling member 300 according to embodiment 1. That is, light reflected by first reflection surface 321 to reach second reflection surface 322 is laterally reflected by second reflection surface 322 toward the side surface of light flux controlling member 700, and emitted to the outside of light flux controlling member 700 from the side surface of light flux controlling member 700.

In light flux controlling member 700 according to the present modification, each incidence unit 310 further includes convex part 736.

Convex parts 736 are disposed at the four corners on the back side of light flux controlling member 700 so as to correspond to first reflection surfaces 321 of respective incidence units 310. In the present modification, convex part 736 has a shape of an inverted truncated cone, and a recess whose inner surface serves as incidence surface 320 opens onto the upper surface of convex part 736. Accordingly, when light flux controlling member 700 is viewed in plan view (view from the bottom), the upper surface of the truncated cone (the surface on the light emitting element 220 side) is larger than incidence surface 320. The height of convex part 736 is not limited as long as convex part 736 does not come into contact with light emitting element 220. The height of convex part 736 is, for example, 0.05 mm to 1.0 mm. In the present modification, the height of convex part 736 is 0.25 mm. In addition, the distance between the centers of incidence surface 320 and first reflection surface 321 in light flux controlling member 700 in modification 4 of embodiment 1 is the same as the distance between the centers of incidence surface 320 and first reflection surface 321 in light flux controlling member 300 in embodiment 1. In other words, incidence surface 320 in the present modification is extended toward the light emitting element 220 side compared to incidence surface 320 in embodiment 1. This configuration allows a larger amount of light to enter light flux controlling member 700. In addition, embodiment 1 and modification 4 of embodiment 1 have the same distance between substrate 210 (on which light emitting element 220 mounted) and the back surface of the light flux controlling member (or the portion of the back surface of the light flux controlling member where convex part 736 is not disposed). In the present modification, a gap for releasing the heat generated by light emitting element 220 to the outside is formed between substrate 210 and light flux controlling member 700.

Effects

Light flux controlling member 700 according to the present modification can also reduce the difference in the luminance on the light emitting surface of the surface light source device between a region corresponding to corner portion 10 of light flux controlling member 700 and a region corresponding to side portion 20 of light flux controlling member 700 in a similar manner to light flux controlling member 300 according to embodiment 1. Therefore, the distance between the light emitting devices can be increased while luminance unevenness is reduced. In addition, as convex part 736 is disposed on the back side of light flux controlling member 700, a larger amount of light emitted from light emitting element 220 is allowed to enter light flux controlling member 700.

Embodiment 2

Configurations of Surface Light Source Device, Light Emitting Device, and Light Flux Controlling Member The surface light source device according to embodiment 2 is different from surface light source device 100 according to embodiment 1 in the following points: in plan view, light flux controlling member 800 has a shape different from the light flux controlling member of surface light source device 100; second reflection surface 322 is the inner surface of a bottomed recess, not of a through hole, in light flux controlling member 800; and the surface light source device according to embodiment 2 includes at least one leg 534 disposed on the back side of light flux controlling member 800. In the surface light source device according to embodiment 2, the same members as in surface light source device 100 according to embodiment 1 are designated by the same reference numerals and the description thereof will be omitted.

FIGS. 12A to 12C illustrate light flux controlling member 800 according to embodiment 2. FIG. 12A is a plan view of light flux controlling member 800, FIG. 12B is a bottom view of light flux controlling member 800, and FIG. 12C is a cross-sectional view taken along line A-A of FIG. 12A.

Light flux controlling member 800 according to embodiment 2 has a shape in plan view such that the midpoint of each side of a quadrangle (square) is moved toward the center of the quadrangle. In the present embodiment, each corner of the quadrangle is rounded, but the angle formed by extending two adjacent sides (straight lines) is an acute angle.

In light flux controlling member 800 according to the present modification, second reflection surface 322 is an inner surface of a bottomed recess that opens onto the front side of light flux controlling member 800. The portion under this recess (the portion between the bottom surface of the recess and the back surface of light flux controlling member 800) emits light from incidence unit 310 while guiding the light to function like emission unit 330. In light flux controlling member 800 according to the present embodiment, second reflection surface 322 has the same function as second reflection surface 322 of light flux controlling member 300 according to embodiment 1. That is, light reflected by first reflection surface 321 to reach second reflection surface 322 is laterally reflected by second reflection surface 322 toward the side surface of light flux controlling member 800, and emitted to the outside of light flux controlling member 800 from the side surface of light flux controlling member 800.

Light flux controlling member 800 according to the present embodiment further includes legs 534 in addition to plurality of incidence units 310 and plurality of emission units 330. Leg 534 is the same as leg 534 of modification 2 of embodiment 1, thus the description thereof will be omitted.

Effects

Light flux controlling member 800 according to the present embodiment can also reduce the difference in the luminance on the light emitting surface of the surface light source device between a region corresponding to corner portion 10 of light flux controlling member 800 and a region corresponding to side portion 20 of light flux controlling member 800 in a similar manner to light flux controlling member 300 according to embodiment 1. Therefore, the distance between the light emitting devices can be increased while luminance unevenness is reduced. In addition, when legs are disposed in the vicinity of the center (center of gravity) of a conventional light flux controlling member, a bright part is more likely to be generated immediately above the center of the light flux controlling member due to the influence of the legs. On the other hand, a reduced amount of light reaches the vicinity of the center of gravity of light flux controlling member 800 according to the present embodiment because of second reflection surface 322 in light flux controlling member 800, thus even when legs are disposed in the vicinity of the center of gravity of light flux controlling member 800, a bright part is less likely to be generated immediately above light flux controlling member 800.

Modification 1 of Embodiment 2

Configurations of Surface Light Source Device, Light Emitting Device, and Light Flux Controlling Member The surface light source device according to modification 1 of embodiment 2 is different from surface light source device 100 according to embodiment 1 in the following points: in plan view, light flux controlling member 900 has a shape different from the light flux controlling member of surface light source device 100; second reflection surface 322 is the inner surface of a bottomed recess, not of a through hole, in light flux controlling member 900; and the surface light source device according to modification 1 of embodiment 2 includes protrusion 635 disposed on the front side of light flux controlling member 900. In the surface light source device according to the present modification, the same members as in surface light source device 100 according to embodiment 1 are designated by the same reference numerals and the description thereof will be omitted.

Figures 13A, 13B:
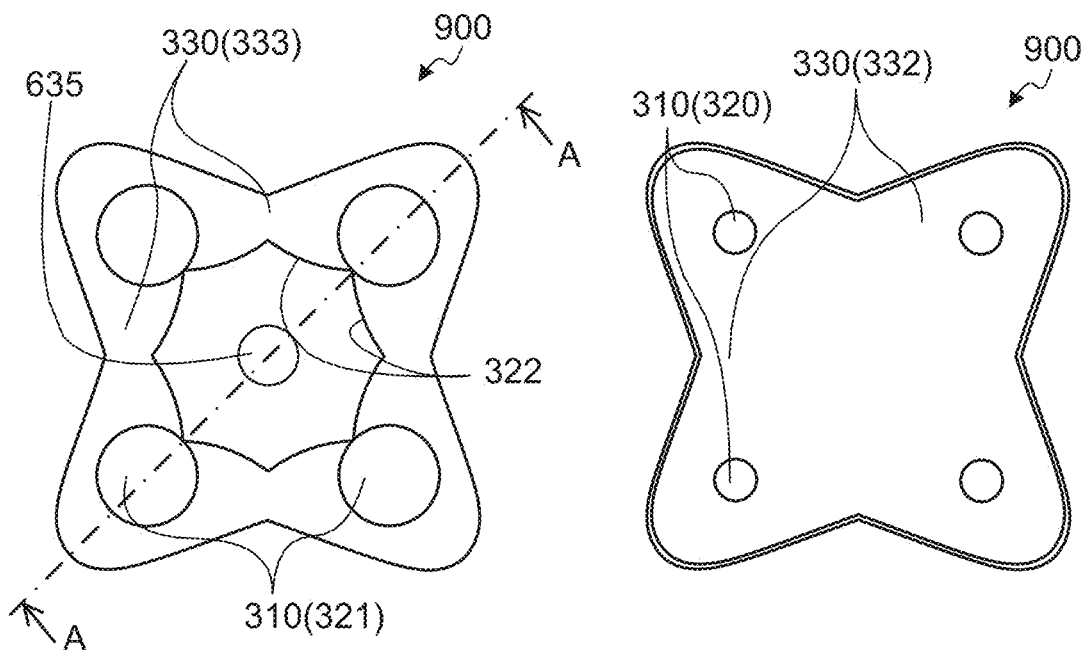
FIGS. 13A to 13C illustrate a light flux controlling member according to modification 1 of embodiment 2.
Figure 13C:
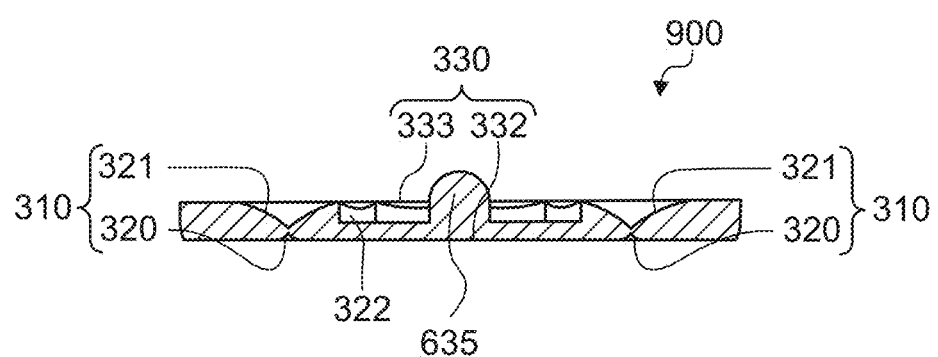

FIGS. 13A to 13C illustrate light flux controlling member 900 according to modification 1 of embodiment 2. FIG. 13A is a plan view of light flux controlling member 900, FIG. 13B is a bottom view of light flux controlling member 900, and FIG. 13C is a cross-sectional view taken along line A-A of FIG. 13A.

Light flux controlling member 900 according to the present modification has a shape in plan view such that the midpoint of each side of a quadrangle (square) is moved toward the center of the quadrangle. In the present modification, each corner of the quadrangle is rounded, but the angle formed by extending two adjacent sides (straight lines) is an acute angle.

In light flux controlling member 900 according to the present modification, second reflection surface 322 is an inner surface of a bottomed recess that opens onto the front side of light flux controlling member 900. The portion under this recess (the portion between the bottom surface of the recess and the back surface of light flux controlling member 900) emits light from incidence unit 310 while guiding the light to function like emission unit 330. In light flux controlling member 900 according to the present modification, second reflection surface 322 has the same function as second reflection surface 322 of light flux controlling member 300 according to embodiment 1. That is, light reflected by first reflection surface 321 to reach second reflection surface 322 is laterally reflected by second reflection surface 322 toward the side surface of light flux controlling member 900, and emitted to the outside of light flux controlling member 900 from the side surface of light flux controlling member 900.

Light flux controlling member 900 according to the present modification further includes protrusion 635 in addition to plurality of incidence units 310 and plurality of emission units 330. Protrusion 635 is the same as protrusion 635 of modification 3 of embodiment 1, thus the description thereof will be omitted.

Effects

Light flux controlling member 900 according to the present modification can also reduce the difference in the luminance on the light emitting surface of the surface light source device between a region corresponding to corner portion 10 of light flux controlling member 900 and a region corresponding to side portion 20 of light flux controlling member 900 in a similar manner to light flux controlling member 300 according to embodiment 1. Therefore, the distance between the light emitting devices can be increased while luminance unevenness is reduced. In addition, as protrusion 635 is disposed, light diffusion plate 120 can be prevented from coming into contact with the surface of light flux controlling member 900 except for protrusion 635.

Modification 2 of Embodiment 2

Configurations of Surface Light Source Device, Light Emitting Device, and Light Flux Controlling Member The surface light source device according to modification 2 of embodiment 2 is different from surface light source device 100 according to embodiment 1 in the following points: in plan view, light flux controlling member 1000 has a shape different from the light flux controlling member of surface light source device 100; second reflection surface 322 is the inner surface of a bottomed recess, not of a through hole, in light flux controlling member 1000; and the surface light source device according to modification 2 of embodiment 2 includes convex part 736 disposed on the back side of light flux controlling member 1000. In the surface light source device according to modification 2 of embodiment 2, the same members as in surface light source device 100 according to embodiment 1 are designated by the same reference numerals and the description thereof will be omitted.

FIGS. 14A to 14C illustrate light flux controlling member 1000 according to modification 2 of embodiment 2. FIG. 14A is a plan view of light flux controlling member 1000, FIG. 14B is a bottom view of light flux controlling member 1000, and FIG. 14C is a cross-sectional view taken along line A-A of FIG. 14A.

Light flux controlling member 1000 according to the present modification has a shape in plan view such that the midpoint of each side of a quadrangle (square) is moved toward the center of the quadrangle. In the present modification, each corner of the quadrangle is rounded, but the angle formed by extending two adjacent sides (straight lines) is an acute angle.

In light flux controlling member 1000 according to the present modification, second reflection surface 322 is an inner surface of a bottomed recess that opens onto the front side of light flux controlling member 1000. The portion under this recess (the portion between the bottom surface of the recess and the back surface of light flux controlling member 1000) emits light from incidence unit 310 while guiding the light to function like emission unit 330. In light flux controlling member 1000 according to the present modification, second reflection surface 322 has the same function as second reflection surface 322 of light flux controlling member 300 according to embodiment 1. That is, light reflected by first reflection surface 321 to reach second reflection surface 322 is laterally reflected by second reflection surface 322 toward the side surface of light flux controlling member 1000, and emitted to the outside of light flux controlling member 1000 from the side surface of light flux controlling member 1000.

Light flux controlling member 1000 according to the present modification further includes convex parts 736 in addition to plurality of incidence units 310 and plurality of emission units 330. Convex part 736 is the same as convex part 736 of modification 4 of embodiment 1, thus the description thereof will be omitted.

Effects

Light flux controlling member 1000 according to the present modification can also reduce the difference in the luminance on the light emitting surface of the surface light source device between a region corresponding to corner portion 10 of light flux controlling member 1000 and a region corresponding to side portion 20 of light flux controlling member 1000 in a similar manner to light flux controlling member 300 according to embodiment 1. Therefore, the distance between the light emitting devices can be increased while luminance unevenness is reduced. In addition, as convex part 736 is disposed on the back side of light flux controlling member 1000, a larger amount of light emitted from light emitting element 220 is allowed to enter light flux controlling member 1000.

INDUSTRIAL APPLICABILITY

The light emitting device and the surface light source device according to the present invention can be applied to, for example, a backlight of a liquid crystal display device and general-purpose lighting.

REFERENCE SIGNS LIST

10 Corner portion
20 Side portion
100 Surface light source device
100' Display device
102 Display member
110 Casing
112 Bottom plate
114 Top plate
120 Light diffusion plate
200 Light emitting device
210 Substrate
220 Light emitting element
300, 400, 500, 600, 700, 800, 900, 1000 Light flux controlling member
310 Incidence unit
320 Incidence surface
321 First reflection surface
322 Second reflection surface
330 Emission unit
332 Third reflection surface
333 Emission surface
534 Leg
635 Protrusion
736 Convex part
CA Central axis
OA Optical axis

What is claimed is:

1. A light flux controlling member for controlling a distribution of light emitted from a plurality of light emitting elements disposed on a substrate, the light flux controlling member comprising:
a plurality of incidence units for allowing thereon incidence of the light emitted from the plurality of light emitting elements respectively, the plurality of incidence units being disposed in a grid pattern; and
a plurality of emission units individually disposed between the plurality of incidence units, the plurality of emission units allowing emission of the light incident on the plurality of incidence units while guiding the light,
wherein the plurality of incidence units each include:
an incidence surface disposed on a back side of the light flux controlling member, the incidence surface allowing thereon incidence of the light emitted from the light emitting element,
a first reflection surface disposed on a front side of the light flux controlling member at a position facing the light emitting element with the incidence surface placed between the first reflection surface and the light emitting element, the first reflection surface laterally reflecting the light incident on the incidence surface in such a way that the reflected light travels along the substrate and away from an optical axis of the light emitting element, and a second reflection surface disposed on the front side of the light flux controlling member at a position facing a side surface of the light flux controlling member with the first reflection surface placed between the second reflection surface and the side surface, the second reflection surface laterally reflecting a part of the light reflected by the first reflection surface toward the side surface of the light flux controlling member.

2. The light flux controlling member according to claim 1, wherein:

the second reflection surface has an inclination angle with respect to the substrate in a range of 70° to 110°.

3. The light flux controlling member according to claim 1, wherein:

when the light flux controlling member is viewed in plan view, in each of the plurality of incidence units, the second reflection surface is disposed in such a way that as a distance from the second reflection surface to a first straight line increases, a distance from the second reflection surface to a second straight line increases, the first straight line connecting the optical axis of the light emitting element corresponding to the incidence unit with a center of gravity of a triangle formed by connecting respective centers of the incidence unit and two incidence units among the plurality of incidence units, the two incidence units being closest to the incidence unit, the second straight line passing through the optical axis of the light emitting element and being perpendicular to the first straight line.

4. The light flux controlling member according to claim 1, wherein:

each of the second reflection surfaces is an inner surface of a recess that opens onto the front side of the light flux controlling member, or an inner surface of a through hole that opens onto the front side and the back side of the light flux controlling member.

5. The light flux controlling member according to claim 1, further comprising:

a leg disposed on the back side of the light flux controlling member, wherein the leg is disposed in such a way that when the light flux controlling member is viewed in plan view, the leg is closer to a center of gravity of the light flux controlling member than each of the second reflection surfaces is.

6. A light emitting device, comprising:

a plurality of light emitting elements disposed on a substrate; and the light flux controlling member according to claim 1 disposed above the plurality of light emitting elements.

7. The light emitting device according to claim 6, wherein:

the light sequentially reflected by each of the first reflection surfaces and the second reflection surfaces is emitted from the side surface of the light flux controlling member to an outside of the light flux controlling member.

8. The light emitting device according to claim 7, wherein the light emitted to the outside of the light flux controlling member includes light substantially parallel to the substrate.

9. A surface light source device, comprising:

a plurality of the light emitting devices according to claim 6; and a light diffusion plate that transmits light emitted from the plurality of light emitting devices while diffusing the light.

10. A display device, comprising:

the surface light source device according to claim 9; and a display member to be illuminated with light emitted from the surface light source device.

* * * * *